United States Patent
Engel et al.

(10) Patent No.: US 11,845,700 B2
(45) Date of Patent: Dec. 19, 2023

(54) METHOD FOR PRODUCING A SEMI-FINISHED METAL PRODUCT, METHOD FOR PRODUCING A METAL-CERAMIC SUBSTRATE, AND METAL-CERAMIC SUBSTRATE

(71) Applicant: Rogers Germany GmbH, Eschenbach (DE)

(72) Inventors: Maximilian Engel, Luhe-Wildenau (DE); Xinhe Tang, Eschenbach (DE); Stefan Britting, Schnaittach (DE)

(73) Assignee: ROGERS GERMANY GMBH, Eschenbach (DE)

( * ) Notice: Subject to any disclaimer, the term of this patent is extended or adjusted under 35 U.S.C. 154(b) by 384 days.

(21) Appl. No.: 16/768,340

(22) PCT Filed: Nov. 21, 2018

(86) PCT No.: PCT/EP2018/082008
§ 371 (c)(1),
(2) Date: May 29, 2020

(87) PCT Pub. No.: WO2019/105814
PCT Pub. Date: Jun. 6, 2019

(65) Prior Publication Data
US 2020/0361828 A1 Nov. 19, 2020

(30) Foreign Application Priority Data
Nov. 29, 2017 (DE) .......................... 102017128316.1

(51) Int. Cl.
*C04B 37/02* (2006.01)
*B32B 9/00* (2006.01)

(52) U.S. Cl.
CPC ............ *C04B 37/021* (2013.01); *B32B 9/005* (2013.01); *C04B 2237/407* (2013.01); *C04B 2237/54* (2013.01)

(58) Field of Classification Search
None
See application file for complete search history.

(56) References Cited

U.S. PATENT DOCUMENTS 5,686,190 A   11/1997 Mennucci et al.
8,448,842 B1 *  5/2013 Wu ...................... B23K 20/233
                                                           427/205

(Continued)

FOREIGN PATENT DOCUMENTS

CN       104755445 A      7/2015
DE    102015224464 A1     6/2017

(Continued)

OTHER PUBLICATIONS

IPRP Report dated Jun. 4, 2020 for International Application No. PCT/EP2018/082008; International Filing Date: Nov. 21, 2018, 6 pages.

*Primary Examiner* — Seth Dumbris
(74) *Attorney, Agent, or Firm* — CANTOR COLBURN LLP

(57) ABSTRACT

A method for producing a semi-finished metal product (2), in particular a semi-finished copper product, for a metal-copper substrate, in particular for a copper-ceramic substrate, including:
  providing a first metal layer (11), in particular a first copper layer, and a second metal layer (12), in particular a second copper layer,
  joining the first metal layer (11) and the second metal layer (12) to form the semi-finished metal product (2), wherein, chronologically before the first metal layer (11) is joined to the second metal layer (12) by means (Continued)

of different temperature treatments, a grain growth in the first metal layer (11) and/or the second metal layer (12) is initiated in such a way that in the produced semi-finished metal product (2), in particular in the produced metal-copper substrate, a first grain size in the first metal layer (11) differs from a second grain size in the second metal layer (12).

7 Claims, 3 Drawing Sheets

(56) References Cited

U.S. PATENT DOCUMENTS

| | | | |
|---|---|---|---|
| 2012/0107642 A1* | 5/2012 | Meyer | C04B 37/021 |
| | | | 156/60 |
| 2012/0325517 A1 | 12/2012 | Uzoh et al. | |
| 2013/0216302 A1* | 8/2013 | Yanase | B23K 20/233 |
| | | | 228/176 |
| 2019/0002358 A1* | 1/2019 | Zeiger | B32B 7/022 |

FOREIGN PATENT DOCUMENTS

| | | |
|---|---|---|
| WO | 2017097758 A1 | 6/2017 |
| WO | 2017144329 A1 | 8/2017 |

\* cited by examiner

METHOD FOR PRODUCING A SEMI-FINISHED METAL PRODUCT, METHOD FOR PRODUCING A METAL-CERAMIC SUBSTRATE, AND METAL-CERAMIC SUBSTRATE

CROSS-REFERENCE TO RELATED APPLICATIONS

This application is a National Stage application of PCT/EP2018/082008, filed Nov. 21, 2018, which claims the benefit of German Application No. 10 2017 128 316.1, filed Nov. 29, 2017, both of which are incorporated by reference in their entirety herein.

BACKGROUND

The present invention relates to a method for producing a semi-finished metal product, a method for producing a metal-ceramic substrate and a metal-ceramic substrate.

Metal-ceramic substrates are sufficiently known as carriers for electrical or electronic components. Typically, such metal-ceramic substrates comprise a ceramic layer with a metallization, the ceramic layer being structured for insulation and the metallization for the formation of conductor tracks and connection points for the electrical or electronic components. In addition, a copper-ceramic substrate is known from DE 10 2015 224 464 A1, in which the copper layer, i.e. the metallization, has a first layer with an averaged first grain size and a second layer with an averaged second grain size, the averaged first grain size differing from the averaged second grain size. This design enables metallization in which the copper layer facing the ceramic layer is coarser-grained than the copper layer facing away from the ceramic layer.

This is advantageous in that the larger grain size on the ceramic layer results in a lower yield strength and thus improved thermal-shock resistance. The result is a reduced probability of delamination or crack formation between the metallization and the ceramic layer or within the ceramic layer parallel to the copper-ceramic interface during temperature changes, especially on the interface between copper and ceramic. At the same time, the finer-grained ceramic layer, which forms the outer surface of the metallization, is advantageous for further processing with electrical or electro-optical systems, the bonding of electrical or electronic components to the copper layer and the overall visual impression.

For the formation of the different averaged grain sizes, DE 10 2015 224 464 A1 proposes a method in which a temperature treatment and/or different copper materials are provided, in which grain growth is induced, especially during the process of bonding to the copper layer. The method should also be simpler and more cost-effective.

SUMMARY

Starting from this background, the present invention considers it to be a task to further improve the metal-ceramic substrates known from the state of the art or the method for their production, in particular with regard to a first or second grain size which is set as optimally as possible for the application.

This task is solved by a method for producing a metal-ceramic substrate according to the description herein, in particular, a method for producing a semi-finished metal product as described herein, and a metal-ceramic substrate as described herein. Further advantages and features of the invention result from the description and the attached figures.

According to the invention, a method for producing a semi-finished metal product, in particular a semi-finished copper product, for a metal-copper substrate, in particular for a copper-ceramic substrate, is provided, comprising:

providing a first metal layer, in particular a first copper layer, and a second metal layer, in particular a second copper layer;

joining of the first metal layer and the second metal layer to form the metal semi-finished product, wherein, chronologically before the first metal layer is joined to the second metal layer by means of different temperature treatments, a grain growth in the first metal layer and/or the second metal layer is initiated in such a way that in the produced semi-finished metal product, in particular in the produced metal-copper substrate, a first grain size in the first metal layer differs from a second grain size in the second metal layer.

Further advantages and features result from the following description of preferred embodiments of the subject matter of the invention with reference to the attached figures. Individual features of the individual embodiments can be combined within the scope of the invention.

DETAILED DESCRIPTION

Figure 1:
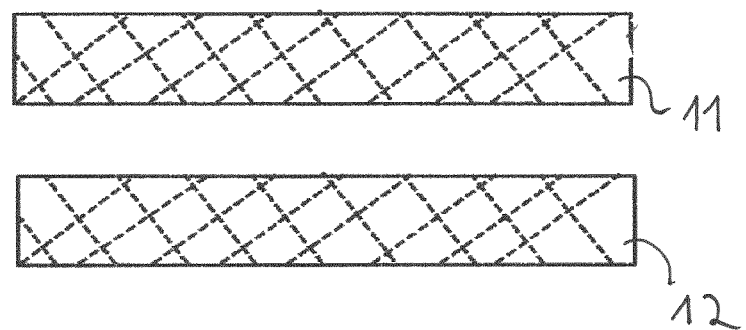
FIGS. 1 to 5: show method steps of a method for producing a metal-ceramic substrate according to an exemplary embodiment of the present invention

Compared to the state of the art, the method according to the invention differs in that, even before the first and second metal layers are joined together, a grain growth is induced with which the first grain size and the second grain size can be adjusted in the later produced semi-finished metal product. By means of the grain growth induced in the run-up to bonding, the first metal layer and the second metal layer can be prepared in a simple manner and in each case individually controlled for the later bonding of the first metal layer and the second metal layer to one another or the later bonding of the semi-finished metal product to the ceramic layer to form the metal-copper substrate.

In particular, the different temperature treatments in the run-up to bonding allow the conditions for the formation of a first grain size and a second grain size different from the first grain size to be realized and the first metal layer and the second metal layer in the bonded state to be subjected to a joint temperature treatment. It is preferably provided that the grain growth prior to joining by the temperature treatment is not carried out until the desired final first or second grain size is obtained, but that the final first or second grain size is only realized when the first metal layer is joined to the second metal layer or when the semi-finished metal product is joined to the ceramic layer. By the final first or second grain size, the expert preferably understands the grain size that is present in the produced semi-finished metal product or in the produced semi-finished metal-copper product. In particular, it is intended that grain growth is initiated exclusively in the second metal layer and that the temperature treatment of the first metal layer consists in providing the first metal layer at room temperature.

In principle, it is conceivable that further second metal layers are provided, which are arranged between the first and second metal layers in the produced semi-finished metal product. In particular, the further second metal layers facing the second metal layer are subjected to a preparatory temperature treatment. Preferably, the semi-finished metal product consisting of the first and second metal layers is to have a thickness in the direction of the layers which is less than 5 mm, preferably less than 3 mm and more preferably less than 1 mm cm. Furthermore, when the first metal layer and the second metal layer are joined together, it is possible to set a desired ratio between a first layer thickness of the first metal layer measured in the layer direction or stacking direction and a second layer thickness of the second metal layer measured in the layer direction or stacking direction. Preferably the first metal layer is thicker than the second metal layer, preferably 1.1 to 15 times as thick, preferentially 2 to 10 times as thick and more preferentially 3 to 8 times as thick, or the second metal layer is thicker than the first metal layer, preferably 1.1 to 15 times as thick, preferentially 2 to 10 times as thick and more preferentially 3 to 8 times as thick.

According to a further embodiment of the present invention, it is provided that the first metal layer and the second metal layer are made of the same metal material. This makes it possible in an advantageous manner to avoid having to compromise on the choice of material for the first or the second metal layer when joining the first metal layer and the second metal layer to form a grain size gradient. In particular, the first metal layer and the second metal layer correspond to each other in terms of their oxygen content or degree of purity. For example, it is conceivable that the first and second metal layers are made of high-purity copper such as Cu-OFE (Cu 99.99 wt. %). In order to influence grain growth, it is advantageous if a grain refining agent or grain nuclei are added to the first and/or second metal layer, which limit grain growth in the respective metal layer. Preferably, the grain refining agent or the grain nuclei are added in such quantities that they influence grain growth but do not affect the mechanical and electrical properties of the first and second metal layers. Preferably, the quantity of the grain refiner agents or of the grain nuclei is the same or the quantity of grain refiner agent or grain nuclei in the first metal layer is 1.5 to 15,000 times, preferably 2 to 2,000 times and more preferably 4 to 100 times as large as the quantity of agents for influencing the grain refiner agents or the grain nuclei in the second metal layer. Furthermore, it is preferably provided that the quantity of grain refiner agent or the grain nuclei in the second metal layer or the second metal layer is less than 1.5% by weight, preferably less than 1.0% by weight and more preferably less than 0.1% by weight. By the first grain size or the second grain size is meant in particular an average grain size in the metal of the first or second metal layer.

In particular, to an expert, a fine structure is a metal layer with a comparatively small average grain size, in particular with an extension or dimension of less than 100 µm, and a coarse structure is a metal layer with a comparatively large average grain size, preferably with an extension or dimension of more than 100 µm. Furthermore, it is preferably provided that in the first metal layer the first average grain size and in the second metal layer the second average grain size, in particular in a direction parallel and/or perpendicular to the layer direction, is substantially constant in each case. This can be achieved with advantage by a uniform distribution of the means for influencing the grain size. However, it is also conceivable that a desired grain size distribution within the first metal layer or the second metal layer can be achieved by means of a well-directed local distribution of the means for influencing the grain size.

It is advisable that the first average grain size is smaller than the second average grain size. Preferably, the second average grain size should be between 160 and 2,000 µm, preferably between 200 and 1,000 µm and more preferably between 250 and 500 µm.

Furthermore, it is preferred that the first average grain size is between 50 and 200 µm, preferably between 70 and 150 µm and more preferably between 80 and 120 µm. The average grain size is determined as the average value of the grain sizes distributed along a plane perpendicular to the direction of the layer.

In a further embodiment of the present invention it is provided that the second metal layer is thicker than the first metal layer, preferably 1.1 to 15 times as thick, preferentially 2 to 10 times as thick and more preferentially 3 to 8 times as thick. This provides the second metal layer with its larger first average grain size with a corresponding installation space, while for the first metal layer it is taken into account that the finer microstructure requires less installation space Preferably, the grain refiner agent is an alloying metal with a comparatively high affinity for oxygen and the lowest possible edge solubility. This allows the required amount of grain refiner agent to be kept as low as possible so that the metal of the first metal layer and the second metal layer is not contaminated in such a way that the first metal layer and the second metal layer are not suitable for use as metallization in power electronics. In particular, it has been found that in the case of the grain refiner agents B, Ca, Fe, Cr, and zirconium arsenide, at least a few per mille (thousand) must be added in order to have a decisive influence on grain growth, so that after their addition, in the case of copper as a metal for the first and second metal layer, no Cu OFE or Cu PHC is present any more. In contrast, it has been found that alloying metals such as titanium, zirconium, hafnium, chromium and/or niobium in even small quantities are suitable for forming certain grain sizes in the desired size. Preferably, the percentage by weight of the grain refiner agent in the first or second metal layer is less than 2.5% by weight, preferably less than 1.5% by weight and more preferably less than 1% by weight or even less than 0.5% by weight. For example, the concentration of the grain refiner agent in the first metal layer or the second metal layer, in particular for a first metal layer and a second metal layer made of Cu-OFE, is for titanium less than 2.1% by weight,
for zirconium, less than 0.17% by weight,
for hafnium less than 1.1% by weight,
for chromium, less than 0.73% by weight; and/or
for niobium less than 0.15% by weight,
together or separately, however, preferably less than 0.01% by weight respectively.

In a further embodiment of the present invention, it is provided that the temperature treatment is an annealing process, wherein the annealing process for the first metal layer preferably differs from the annealing process for the second metal layer. In particular, the annealing process is a heating of the first and/or the second metal layer above the recrystallisation temperature. Preferably only the second metal layer is subjected to the annealing process. However, it is also conceivable that the annealing process for the first metal layer and the second metal layer differ, for example, with regard to duration, temperature control and/or temperature level, and thus a differently pronounced grain growth is realized in the first metal layer and the second metal layer.

It is particularly preferred that the metal layer structure is made of copper, i.e. the first metal layer is a first copper layer and the second metal layer is a second copper layer. It is also conceivable that the metal composition in the first metal layer differs from the metal composition in the second metal layer.

It is preferable that the temperature treatment is carried out at least temporarily in an inert gas environment or in a vacuum. This is advantageous for achieving a defined grain growth during the temperature treatment. This improves the controlled adjustment of the first or second grain size in the produced semi-finished metal product or produced metal-ceramic substrate.

In a further embodiment of the present invention, it is intended that the first metal layer is bonded to the second metal layer by means of a DCB process. This has the advantage that, for example, rolling or the equipment otherwise necessary for bonding the first metal layer and the second metal layer can be dispensed with. A "DCB process" (Direct Copper Bond Technology) is understood by the expert to be such a process, which serves, for example, to bond metal layers or sheets (e.g. copper sheets or foils) to each other and/or to ceramics or ceramic layers, using metal or copper sheets or metal or copper foils which have a layer or coating (melting layer) of a chemical compound of the metal and a reactive gas, preferably oxygen, on their surface sides. In this method described for example in US-PS 37 44 120 or in DE-PS 23 19 854, this layer or coating (melting layer) forms a eutectic with a melting temperature below the melting temperature of the metal (e.g. copper), so that by placing the foil on the ceramic and heating all the layers, they can be bonded together by melting the metal or copper essentially only in the area of the melting layer or oxide layer.

In particular, the DCB method then has e.g. the following method steps:
  Oxidizing a copper foil in such a way that a uniform copper oxide layer is produced;
  placing the copper foil on the ceramic layer;
  heating the composite to a process temperature between about 1025 to 1083° C., e.g. to about 1071° C.;
  cooling to room temperature.

Furthermore, it is preferably provided that the first metal layer and/or the second metal layer are oxidized, in particular chemically and/or thermally oxidized, chronologically before the bonding. Preferably it is intended that the oxidation is carried out between the temperature treatment and the bonding of the first metal layer with the second metal layer. By oxidation it is advantageously possible in a simple manner to provide a eutectic layer which allows, for example, the bonding of the first metal layer and the second metal layer or the second metal layer to the ceramic layer.

To limit the second grain size, it is advisable to adapt a temperature control during the temperature treatment of the second metal layer and/or to coat the second metal layer with a paste consisting of a metal and a metal oxide, in particular copper and copper oxide. The advantage of limiting the second grain size is that this means that it is not absolutely necessary to set a low oxygen content when bonding to the ceramic layer in order to counteract weakening of the second metal layer or cracking of the second metal layer. This use of a correspondingly low oxygen content would otherwise be necessary due to the area of the grain boundaries in the second metal layer decreasing with increasing grain size and the preferential attachment of oxygen from the eutectic coating to the grain boundaries of the metal in the second metal layer. Therefore, the limitation of the second grain size is advantageous to counteract the adjustment of the corresponding oxygen content, so that the method for producing the compound can be simplified.

A further aspect of the present invention is a method for producing a metal-ceramic substrate, in particular a copper-ceramic substrate, comprising the steps of:
  Providing a first metal layer, in particular a first copper layer, and a second metal layer, in particular a second copper layer,
  bonding the first and/or the second metal layer to a ceramic layer to form the metal-ceramic substrate,
  wherein chronologically before the first metal layer is joined to the second metal layer by means of different temperature treatments, a grain growth in the first metal layer and/or the second metal layer is initiated in such a way that in the produced semi-finished metal product, in particular in the metal-copper substrate produced, a first grain size in the first metal layer differs from a second grain size in the second metal layer. All the features and advantages described for the method of manufacturing the semi-finished metal product according to the invention can also be transferred analogously to the method of manufacturing the metal-ceramic substrate according to the invention.

In principle, it is conceivable here that the first metal layer and the second metal layer are bonded to the ceramic layer as a semi-finished metal product, in particular produced by the method according to the invention, or the first metal layer, the second metal layer and the ceramic layer are bonded to one another in a common bonding step, preferably in a common DCB process. If the first metal layer and the second metal layer are bonded to the ceramic layer as a semi-finished metal product, an AMB process or a DCB process can be used, for example. An active soldering process, i.e. "active metal brazing (AMB)" process, e.g. for joining metal layers or metal foils, in particular also copper layers or copper foils with ceramic material, is a process which is also specifically used for the manufacture of metal-ceramic substrates. In this process, at a temperature between approx. 650-1000° C., a connection is made between a metal foil, for example copper foil, and a ceramic substrate, for example an aluminium nitride ceramic, using a brazing solder which, in addition to a main component such as copper, silver and/or gold, also contains an active metal. This active metal, which for example is at least one element of the group Hf, Ti, Zr, Nb, Ce, forms a bond between the solder and the ceramic by chemical reaction, while the bond between the solder and the metal is a metallic brazed connection.

Correspondingly, the design of the first metal layer with a lower average first grain size compared to the second metal layer prevents a too coarse structure in the first metal layer from making the connection of electronic components more difficult, especially in thin wire bonding. In addition, a comparatively fine structure simplifies automatic optical inspection (AOI), i.e. an inspection of the metal-ceramic substrates after its manufacture. At the same time, a grain size gradient along a layer direction, along which the first metal layer and the second metal layer are layered on the carrier element, is formed when the metal layer structure is bonded. In this process, the Hall-Petch relation $$(R_e = \sigma_0 + \frac{K}{\sqrt{d_k}};$$

with a yield point $R_e$, an initial stress $\sigma_0$, a grain boundary resistance $\sigma_0$ and a grain size $d_k$), which relates an internal stress present in the metal layer with a grain size of the structure, a comparatively coarse structure can be realized in the second metal layer, whereby a stress level in a bonding area in which the second metal layer is bonded to the carrier element is advantageously reduced.

The ceramic from which the ceramic layer is formed may be, for example, $Al_2O_3$, $Si_3N_4$, AlN or an HPSX ceramic (, i.e. a ceramic with an $Al_2O_3$ matrix that comprises an x percent content of $ZrO_2$, for example $Al_2O_3$ with 9% $ZrO_2$=HPS9 or $Al_2O_3$ with 25% $ZrO_2$=HPS25). The carrier element preferably exhibits a comparatively high electrical insulation strength, preferably of more than 5 kV/mm, more preferably of more than 10, 20 or even more than 30 kV/mm and/or with high thermal conductivity, preferably of more than 10 W/mK, more preferably of more than 20 or even more than 60 W/mK, such as technical ceramics or organic insulation materials filled with heat-conducting materials.

According to a further embodiment of the present invention, it is provided that the second metal layer in the produced metal-ceramic substrate is bonded to the ceramic layer, wherein in the produced metal-ceramic substrate a second grain size which is larger than the first grain size is realized in the second metal layer by the annealing process prior to the bonding of the first metal layer to the second metal layer. This advantageously allows the coarser-grained second metal layer to be bonded to the ceramic layer, while the first metal layer facing away from the ceramic layer is finer-grained compared to the second metal layer.

A further object of the present invention is a metal-ceramic substrate produced by a method according to the invention comprising
  a ceramic layer and
  a composite of a first metal layer and a second metal layer bonded to the ceramic layer, wherein a second grain size in the second metal layer is larger than the first grain size in the first metal layer. All the features and their advantages described for the method for producing the metal-ceramic substrate according to the invention can also be transferred analogously to the metal-ceramic substrate according to the invention.

FIGS. 1 to 5 show method steps of a method for producing a metal-ceramic substrate 1 according to a first exemplary embodiment of the present invention. Such metal-ceramic substrates 1 serve as carriers for electrical or electronic components. For the electrically conductive connection of the individual electrical or electronic components, in particular metallizations are provided for the formation of conductor tracks on a ceramic surface or upper side 15 of a ceramic layer 10. In particular, the metallization is structured in order to provide conductor tracks or mounting points for the electronic or electrical components.

Figure 6:
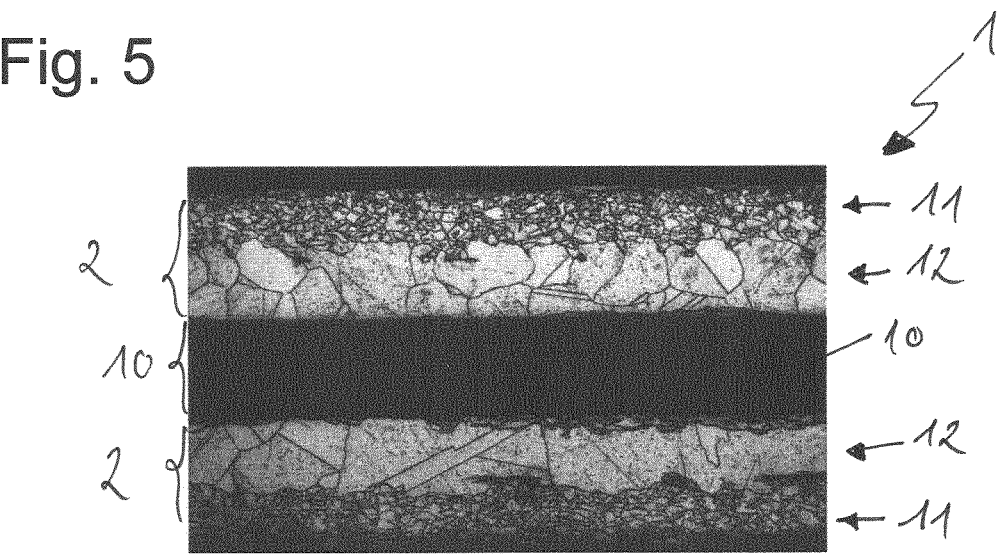
FIG. 6 shows a sectional view of a metal-ceramic substrate according to an exemplary embodiment of the present invention

It has proved to be advantageous here if the metallization applied to the ceramic layer has a first metal layer 11 and a second metal layer 12, wherein a first grain size in the first metal layer 11, i.e. a first average grain size of the metal in the first metal layer 11, differs from a second grain size, i.e. a second average grain size of the metal in the second metal layer 12. In particular, it is intended that the first metal layer 11 and the second metal layer 12 form a compound 2, in particular a sandwich structure, to form the metallization on the ceramic layer 10, i.e. in the finished product the first metal layer 11 and the second metal layer 12 are stacked on top of one another in a stacking direction S running perpendicular to the ceramic surface 15. FIG. 6 shows a metal-ceramic substrate 1, in which such a compound 2 of the first metal layer 11 and the second metal layer 12 is arranged on both the bottom side and the top side. In each case the second metal layer 12 faces the ceramic layer 10 and the first metal layer 11 faces away from the ceramic layer 10, wherein in particular an average first grain size in the first metal layer 11 is smaller than the average second grain size in the second metal layer 12.

Due to the finer-grained design of the first metal layer 11 compared to the second metal layer 12, it is advantageously easier to realize a connection of an electronic or electrical component to the metallization. In addition, a visually detectably more homogeneous or finer top layer can be provided for the metallization on the ceramic layer 10. At the same time, the second metal layer 12, which is coarser-grained than the first metal layer 11, makes it possible to design the connection between the metallization and the ceramic layer in such a way that it is optimized with regard to its thermal shock resistance despite the different thermal expansion coefficients. This means that the second grain size is preferably selected in such a way that the mechanical stress caused by different coefficients of thermal expansion is kept as low as possible. This advantageously increases the lifetime of the metal-ceramic substrate 1. It is also conceivable that the second grain size corresponds approximately to a second layer thickness D2 of the second metal layer 12. It is further provided that the second layer thickness D2 is greater than a first layer thickness D1 of the first metal layer 11. It is also conceivable, for example, that the first grain size assumes a value of less than 100 μm, preferably 50 μm and/or the second grain size assumes a value of more than 100 μm, preferably between 250 and 1000 μm.

Figure 2:
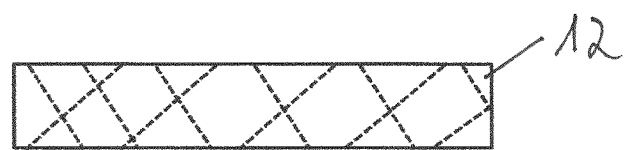

In order to control the first grain size or the second grain size, in particular a ratio between the first grain size and the second grain size, it is intended that the first metal layer 11 and the second metal layer 12, preferably in the form of a first metal sheet and the second metal sheet, are provided (see FIG. 1). The first metal sheet and the second metal sheet are made from the same metal material or have the same specification, e.g. with regard to their oxygen content or purity. For example, the first and second metal layers are Cu-OFE, Cu-OF or Cu-ETP. FIG. 2 shows that the second metal layer, in particular only the second metal layer, is subjected to a heat treatment (see FIG. 2). The temperature treatment preferably comprises an annealing process in which the second metal layer is at least temporarily heated to a temperature above the recrystallisation temperature. This annealing process has the advantage of initiating grain growth in the second metal layer and is carried out to an extent determined by the temperature treatment. Preferably, the annealing process takes place in an inert gas environment or in a vacuum. In this way, grain growth, at least partially, takes place in the second metal layer 12 even before the first metal layer 11 and the second metal layer 12 are joined. In order to achieve a grain structure in the first metal layer 11 and/or the second metal layer 12 which is as uniform as possible, a grain refiner agent or grain nuclei are added to the first metal layer 11 and/or the second metal layer 12. In particular, the grain refiner agent or the grain nuclei are selected in such a way that they do not influence the mechanical and electrical properties of the first metal layer and/or the second metal layer with the exception of their influence on grain growth. For example, the grain refiner agent is Cr, Ti, Zr, Hf, Nb.

Figure 3:
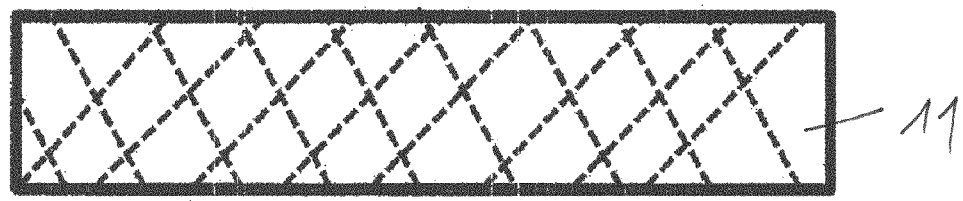
Figure 3:
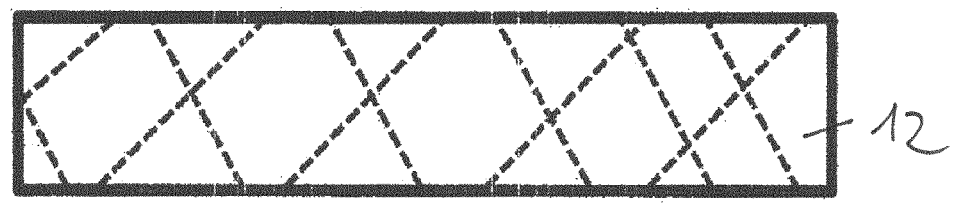

In a method step shown in FIG. 3, the first metal layer 11 and the second metal layer 12 are each subjected to thermal and/or chemical oxidation in order to form a eutectic layer, in particular of Cu and O, which is necessary for joining in the DCB process. If a further temperature treatment is provided for the second metal layer 12 for oxidation, it is preferably provided that the temperature treatment for initiating grain growth and the temperature treatment for oxidation are coordinated with one another in order to limit a desired second grain size and thus avoid giant grain growth, since, due to the reduction of the area of the grain boundaries, second grain sizes which are too large would require a comparatively low oxygen content when bonding the second metal layer 12 to the ceramic layer 10 in order to counteract weakening or even crack formation in the second metal layer 12. Alternatively, it is also conceivable that a paste of metal and metal oxide, in particular Cu and CuO, could be applied to the second metal layer 12 in order to achieve a eutectic composition without the need for oxidation of the second metal layer 12.

Figure 4:
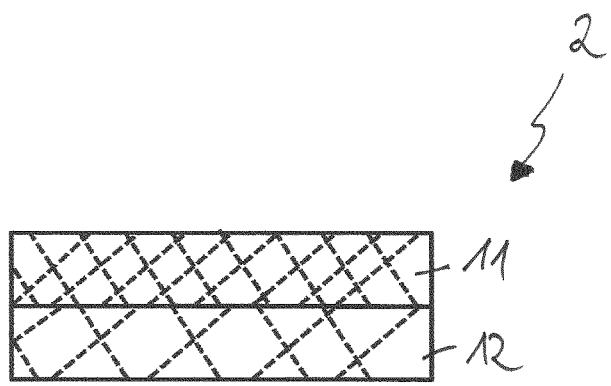
Figure 5:
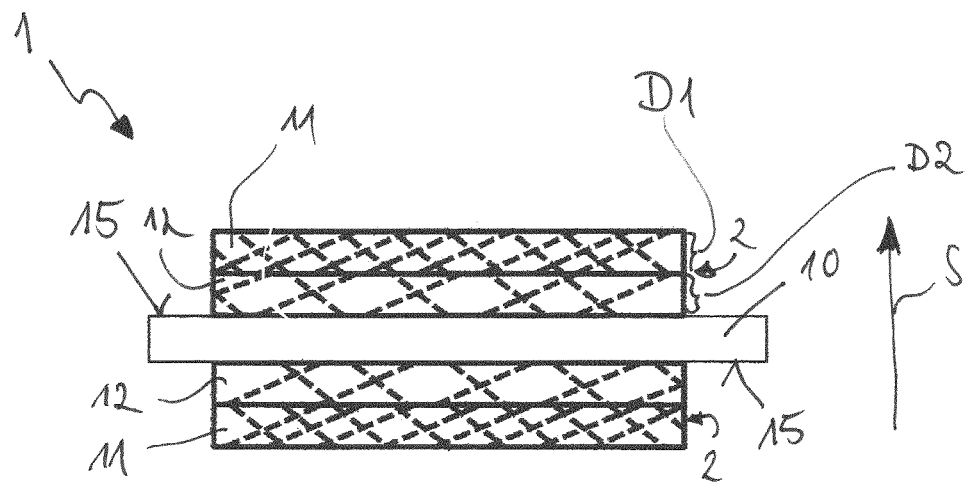

FIG. 4 shows the joining of the first metal layer 11 and the second metal layer 12 to form the semi-finished metal product 2. In this process, the first metal layer 11 and the second metal layer 12 are joined together in a DCB process. FIG. 5 shows a schematic diagram of a metal-ceramic substrate 1, in which a metal compound 2 is arranged on an upper and a lower side of the ceramic layer. It is conceivable here that the first metal layers 11, the second metal layers 12 and the ceramic layers 10 are joined together in a common bonding process, in particular a common DCB process. Alternatively, it is also conceivable that the first metal layer 11 and the second metal layer 21 are provided as semi-finished metal product 2 from FIG. 4 and the semi-finished metal products 2 are bonded to the copper layer 10 in a separate process step, for example by means of a DCB process or an AMB process.

REFERENCE SIGNS 1 metal-ceramic substrate
2 semi-finished metal product
10 ceramic layer
11 first metal layer
12 second metal layer
15 ceramic upper side
S stacking direction
D1 first layer thickness
D2 second layer thickness

The invention claimed is:

1. A method for producing a metal-ceramic substrate, comprising:
   providing a first metal layer and a second metal layer,
   joining the first metal layer and the second metal layer to form a semi-finished metal product,
   wherein, chronologically before the first metal layer is joined to the second metal layer by means of different temperature treatments, a grain growth in the first metal layer and/or the second metal layer is initiated in such a way that in a produced metal-copper substrate, a first grain size in the first metal layer differs from a second grain size in the second metal layer, wherein the final first grain size and the final second grain size is only realized when the semi-finished metal product is joined to a ceramic layer, and
   wherein an active metal brazing (AMB) method at a temperature between 650° C. and 900° C. is used during the bonding of the semi-finished metal product, being formed by the first metal layer and the second metal layer, to the ceramic layer.

2. The method according to claim 1, wherein the first metal layer and the second metal layer are made of the same metal material.

3. The method according to claim 1, wherein a temperature treatment is an annealing process.

4. The method according to claim 1, wherein a temperature treatment is carried out at least temporarily in an inert gas environment or in a vacuum.

5. The method according to claim 1, wherein, in order to limit the second grain size, a temperature control during a temperature treatment of the second metal layer is adapted and/or the second metal layer is coated with a paste consisting of a metal and a metal oxide.

6. The method according to claim 1, wherein one or both of the first metal layer and the second metal layer is a copper layer.

7. The method according to claim 3, wherein an annealing process for the first metal layer differs from the annealing process for the second metal layer.

* * * * *